(12) United States Patent
Durojaiye (10) Patent No.: US 9,256,314 B2
(45) Date of Patent: Feb. 9, 2016

(54) INPUT DATA TYPE PROFILES

(75) Inventor: Olumuyiwa M. Durojaiye, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 354 days.

(21) Appl. No.: 13/421,144

(22) Filed: Mar. 15, 2012

(65) Prior Publication Data

US 2013/0241840 A1    Sep. 19, 2013

(51) Int. Cl.
*G06F 3/041*    (2006.01)
(52) U.S. Cl.
CPC .................................. *G06F 3/0416* (2013.01)
(58) Field of Classification Search
None
See application file for complete search history.

(56) References Cited

U.S. PATENT DOCUMENTS

| | | | |
|---|---|---|---|
| 6,963,937 B1 * | 11/2005 | Kamper et al. ................. | 710/73 |
| 2002/0080123 A1 * | 6/2002 | Kennedy et al. .............. | 345/173 |
| 2005/0225530 A1 * | 10/2005 | Evans et al. ................... | 345/156 |
| 2006/0267957 A1 * | 11/2006 | Kolmykov-Zotov et al. . | 345/173 |
| 2007/0242056 A1 * | 10/2007 | Engelhardt et al. ........... | 345/173 |
| 2008/0013826 A1 | 1/2008 | Hillis et al. | |
| 2008/0158145 A1 | 7/2008 | Westerman | |
| 2008/0313607 A1 | 12/2008 | Yutaka et al. | |
| 2010/0182247 A1 | 7/2010 | Petschnigg et al. | |
| 2011/0122099 A1 | 5/2011 | Zhu et al. | |
| 2011/0157041 A1 | 6/2011 | Weiss et al. | |

FOREIGN PATENT DOCUMENTS

| | | |
|---|---|---|
| JP | 06-083522 A | 3/1994 |
| JP | 09-190268 A | 7/1997 |
| WO | 2011-143720 A1 | 11/2011 |

OTHER PUBLICATIONS

"Event Handling Guide for iOS", Retrieved at <<http://developer.apple.com/library/ios/documentation/EventHandling/Conceptual/EventHandlingiPhoneOS/EventHandlingiPhoneOS.pdf>>, Mar. 10, 2011, pp. 66.
Brandl, et al., "Combining and Measuring the Benefits of Bimanual Pen and Direct-Touch Interaction on Horizontal Interfaces", Retrieved at <<http://www.dgp.toronto.edu/~dwigdor/research/p154-brandl.pdf>>, working conference on Advanced visual interfaces, AVI '08, ACM, May 28-30, 2008, pp. 154-161.
Townsend, Reed, "Build advanced touch apps in Windows 8", Retrieved at <<video.ch9.ms/build/2011/slides/APP-186T_Townsend.pptx>>, Retrieved Date: Nov. 29, 2011, pp. 46.
"International Search Report", Mailed Date: Jun. 28, 2013, Application No. PCT/US2013/031799, Filed Date: Mar. 13, 2013, pp. 9.

* cited by examiner

Primary Examiner — Joseph Haley
Assistant Examiner — Ifedayo Iluyomade
(74) *Attorney, Agent, or Firm* — Jim Banowsky; Kate Drakos; Micky Minhas (57) ABSTRACT

Techniques for providing input data type profiles are described. In at least some embodiments, input data type profiles can be implemented to enable applications to receive different types and/or combinations of input data. For example, input data type profiles can specify different types of input data generated based on input to a tactile input device, such as raw touch data, processed touch data, and pen input data. In at least some embodiments, techniques can be implemented to enable an application to receive multiple types of input data (e.g., combinations of touch data and/or pen input data) in parallel.

20 Claims, 7 Drawing Sheets

INPUT DATA TYPE PROFILES

BACKGROUND

Many devices are configured to support multiple types of input. For example, a laptop computer may receive input from a keyboard, as well as from a touchpad that can receive tactile input. To enable devices to support multiple input types, devices typically include some form of input configuration that specifies priorities for particular input types, as well as how particular input types are to be processed. While the ability to support multiple input types is useful, devices typically lack support for multiple input type configurations.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Techniques for providing input data type profiles are described. In at least some embodiments, input data type profiles can be implemented to enable applications to receive different types and/or combinations of input data. For example, input data type profiles can specify different types of input data generated based on input to a tactile input device, such as raw touch data, processed touch data, and pen input data. In implementations, touch data refers to input data generated based on physical contact by a user with a tactile input device, such as a touchpad, a track pad, a touchscreen, and so on. Pen input data can refer to input to a tactile input device received via a touch instrument, such as an electromagnetic stylus device. In at least some embodiments, techniques can be implemented to enable an application to receive multiple types of input data (e.g., combinations of touch data and/or pen input data) in parallel.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Techniques for providing input data type profiles are described. In at least some embodiments, input data type profiles can be implemented to enable applications to receive different types and/or combinations of input data. For example, input data type profiles can specify different types of input data generated based on input to a tactile input device, such as raw touch data, processed touch data, and pen input data. In implementations, touch data refers to input data generated based on physical contact by a user with a tactile input device, such as a touchpad, a track pad, a touchscreen, and so on. Pen input data can refer to input to a tactile input device received via a touch instrument, such as an electromagnetic stylus device. In at least some embodiments, techniques can be implemented to enable an application to receive multiple types of input data (e.g., combinations of touch data and/or pen input data) in parallel.

Having presented an overview of example implementations in accordance with one or more embodiments, consider now an example environment in which example implementations may by employed.

Example Environment

Figure 1:
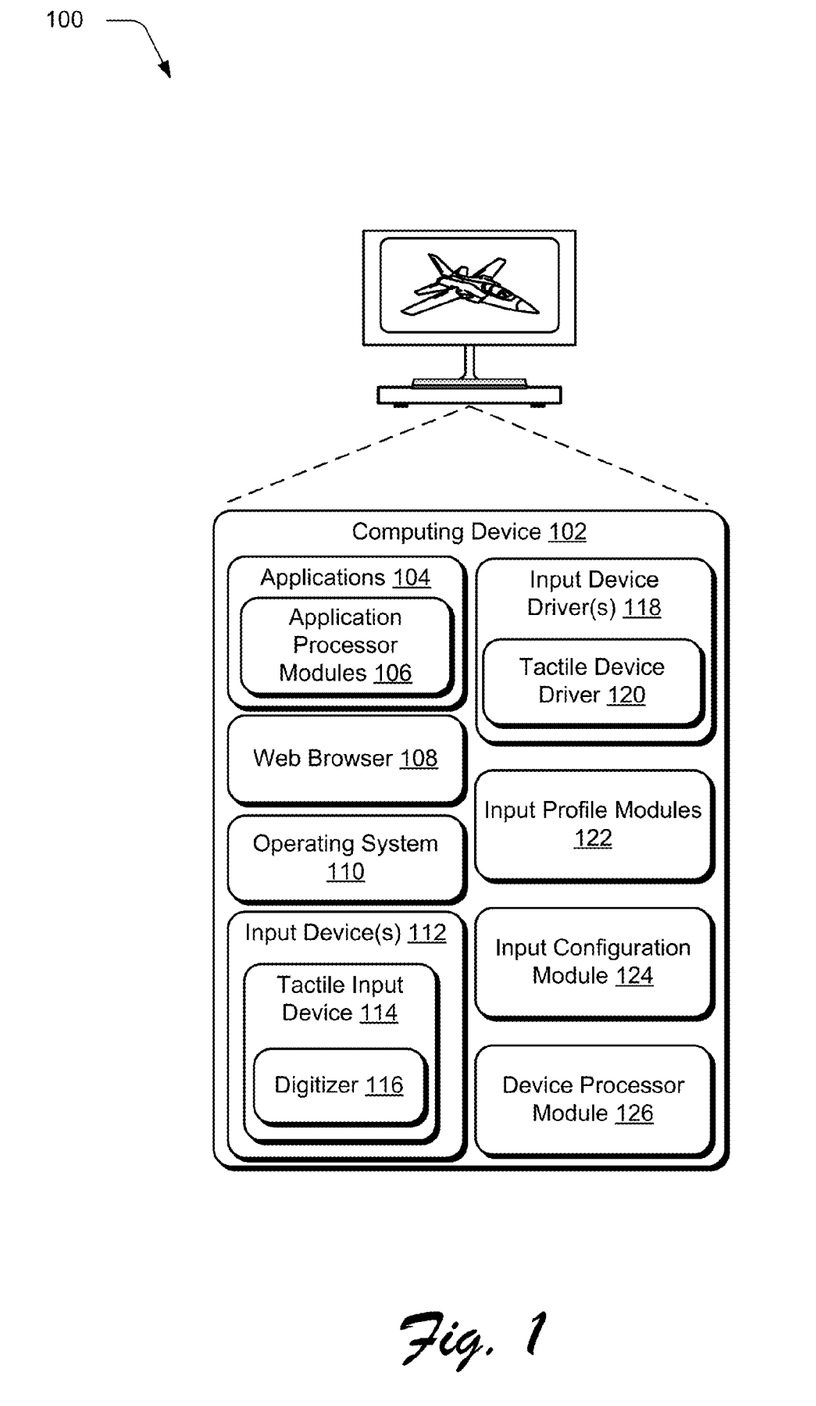
FIG. 1 is an illustration of an environment in an example implementation that is operable to employ techniques discussed herein.

FIG. 1 is an illustration of an environment 100 in an example implementation that is operable to employ techniques for providing input data type profiles described herein. The illustrated environment 100 includes a computing device 102 that may be configured in a variety of ways. For example, the computing device 102 may be configured as a traditional computer (e.g., a desktop personal computer, laptop computer, and so on), a mobile station, an entertainment appliance, a set-top box communicatively coupled to a television, a wireless phone, a netbook, a game console, a handheld device, and so forth as further described in relation to FIG. 7.

Thus, the computing device 102 may range from a full resource device with substantial memory and processor resources (e.g., personal computers, game consoles, slate or tablet-form factor device) to a low-resource device with limited memory and/or processing resources (e.g., traditional set-top boxes, hand-held game consoles). The computing device 102 also includes software that causes the computing device 102 to perform one or more operations as described below.

The computing device 102 includes applications 104, which are representative of functionalities to perform various tasks via the computing device 102. Examples of the applications 104 include a word processor application, an email application, a content editing application, a gaming application, and so on. The applications 104 include application processor modules 106, which are representative of functionality to request particular types of input data, and to process received input data for the applications 104. In implementations, individual of the applications 104 can include their own respective implementations of the application processor modules 106 that are tailored specifically to the individual applications. Further details and implementations of the application processor modules 106 are discussed below.

Further included as part of the computing device 102 is a web browser 108, which is representative of functionality to provide web browsing and/or other tasks via the computing device 102. For example, the web browser 108 can be employed to access network resources (e.g., a website) via one or more networks to which the computing device 102 may connect. Examples of such networks include the Internet, a wide area network (WAN), a local area network (LAN), a wireless network, a public telephone network, an intranet, and so on. The applications 104 and/or the web browser 108 can be implemented in connection with any suitable type of hardware, software, firmware or combination thereof.

Further included as part of the computing device 102 is an operating system 110, which is representative of functionality to manage and provide access to resources of the computing device 102. Also included is at least one input device 112, which is representative of a device that can be employed to receive input for the computing device 102. Examples of the input device 112 are discussed below with reference to FIG. 7. The input device 112 can be implemented as a tactile input device 114, which is configured to receive touch input and pen input for the computing device 102. For example, the tactile input device 114 can be implemented as a touchpad, a track pad, a touchscreen, and so on.

Touch input can be received by the tactile input device 114 in response to physical contact by a user with the tactile input device 114. For example, a user can provide input to the tactile input device 114 by touching the tactile input device 114 with one or more fingers, other portions of the user's hand, and/or any other portion of the user's body. Input can also be received by the tactile input device 114 via a touch instrument, such as a stylus (e.g., an electromagnetic stylus), a touch pen, and so forth. For purposes of discussion herein, input received via a touch instrument is referred to as "pen input." Thus, touch input can be received via physical contact by a user with the tactile input device 114, and pen input can be received via contact by a touch instrument with the tactile input device 114.

The tactile input device 114 includes a digitizer 116, which is representative of functionality to receive analog data generated by input to the tactile input device 114, and convert the analog data into a digital form that can be used by various entities associated with the computing device 102.

In implementations, pen input can be differentiated from touch input based on properties of the input. For example, the tactile input device 114 can detect physical properties of a means by which input is provided to the tactile input device 114. A user's finger and/or hand, for instance, can have different conductive properties than a stylus or other instrument. Thus, in a capacitive input scenario, touch input can be differentiated from pen input based on conductive properties of an input means used to provide input. This implementation is provided for purposes of example only, and a wide variety of other touch and/or pen-based input methods can be supported in accordance with one or more embodiments.

The computing device 102 further includes input device drivers 118, which are representative of functionality to enable entities associated with the computing device 102 to interact with the input devices 112, and vice-versa. For example, one of the input device drivers 118 can receive input data from a respective input device 112, and can communicate the input data to one or more of the applications 104, the web browser 108, the operating system 110, and so forth.

The input device drivers 118 include a tactile device driver 120, which is representative of functionality to enable communication between the tactile input device 114 and various entities of the computing device 102. For example, the tactile device driver 120 can enable input data generated by the tactile input device 114 to be routed to one or more of the applications 104, the web browser 108, the operating system 110, and so forth.

The tactile device driver 120 can also process raw touch data received by the tactile input device 114 into processed touch data. For example, if a user places a finger on a touchscreen of the tactile input device 114, the digitizer 116 can generate raw touch data that approximately describes a total area of the screen in contact with the user's finger. As another example, if a user places the palm of their hand on the touchscreen, the digitizer 116 can generate raw touch data that includes an image (e.g., a bitmap) of the palm.

To enable various entities to utilize touch input, raw touch data can be processed into processed touch data that can be used to perform different tasks. For example, raw touch data that describes an area of a touchscreen in contact with a user's finger can be processed to specify a particular point on the touchscreen, such as with reference to an X-coordinate and a Y-coordinate location on the touchscreen.

For instance, consider a scenario where a user drags their finger across a touchscreen of the tactile input device 114. Raw touch data generated by the digitizer 116 in response to the user dragging their finger can be processed (e.g., by the tactile device driver 120) to indicate a movement of a point across the touchscreen. The movement of the point can be used (e.g., by the operating system 110) to perform a task, such as navigating through a graphical user interface displayed on the touchscreen.

Further included as part of the computing device 102 are input profile modules 122, which are representative of functionality to present different types of input data to various entities of the computing device 102. In implementations, particular input profile modules 122 can present collections of different types of input data, such as combinations of different types of input data generated by the tactile input device 114. In at least some embodiments, one or more of the input profile modules 122 can include human interface device (HID) usage information for the input device 112.

An input configuration module 124 is provided, which is representative of functionality to enable various entities to request different types of input data, such as types of input data represented by the input profile modules 122. For example, the application processor module 106 for one of the applications 104 can send a request to the input configuration module 124 to receive a particular type of input data from the tactile input device 114. In response to the request, the input configuration module 124 can notify the tactile device driver 120 that the tactile device driver is to send input data to the particular application 104 through one of the input profile modules 122 associated with the requested type of input data. Thus, when the application 104 is running and ready to receive input, the tactile device driver 120 can send input data to the application via the appropriate input profile module 122. Accordingly, different applications and/or entities can register with the input configuration module 124 to receive different types of input data via the input profile modules 122.

The computing device 102 further includes a device processor module 126, which is representative of functionality to perform processing on different types of input data received from the input devices 112. For example, the device processor module 126 can receive input data from the tactile input device 114, and can process the input data into a form that can be utilized by various entities, such as the operating system 110.

Figure 2:
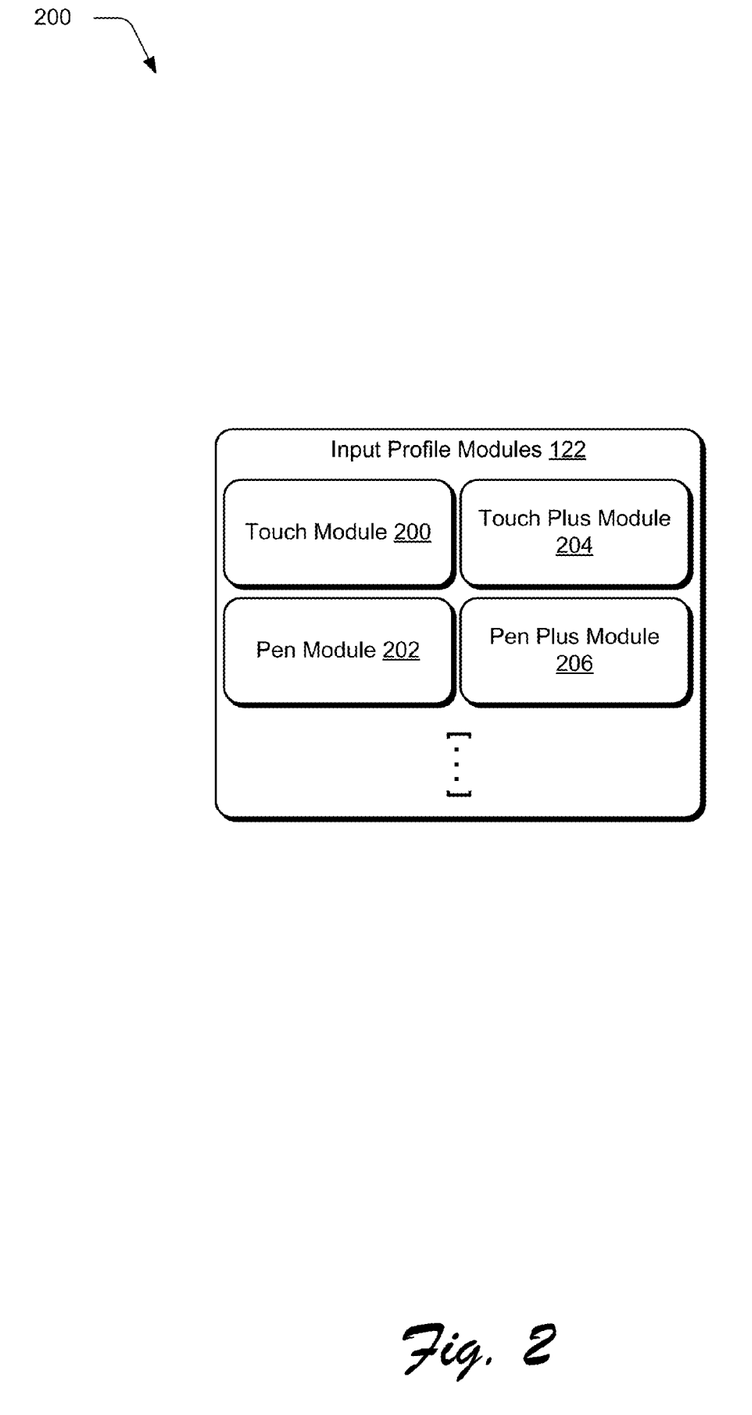
FIG. 2 illustrates example implementations of input profile modules in accordance with one or more embodiments.

FIG. 2 illustrates example implementations of the input profile modules 122, introduced above in the discussion of the environment 100. In this example implementation, the input profile modules 122 include a touch module 200, a pen module 202, a touch plus module 204, and a pen plus module 206.

The touch module 200 is representative of functionality to deliver processed touch data to various entities. For example, the applications 104 and/or or the operating system 110 can receive processed touch data via the touch module 200. The pen module 202 is representative of functionality to deliver pen input data to various entities. In implementations, an entity (e.g., the applications 104 and/or or the operating system 110) can request to receive input data via the pen module

202. Thus, when pen input is received by the tactile input device 114, resulting pen input data can be provided to such an entity via the pen module 202.

The touch plus module 204 is representative of functionality to deliver a combination of processed touch data and raw touch data. For example, the application processor module 106 can provide functionality to process these different types of data for one or more of the applications 104. A particular application, for instance, can use processed touch data for one purpose (e.g., moving a cursor on a screen), and raw touch data for another purpose, such as moving a larger image or collection of images on a screen. Thus, an application that requests to receive input data via the touch plus module 204 can receive processed touch data and raw touch data that result from input to the tactile input device 114.

The pen plus module 206 is representative of functionality to deliver a combination of pen input data, processed touch data, and raw touch data. For example, instances of the application processor modules 106 can provide functionality to process these different types of input data for one or more of the applications 104. A particular application, for instance, can use pen input data for one purpose (e.g., generating text), and raw touch data for another purpose, such as drawing images on a display screen. Thus, an application that requests to receive input data via the pen plus module 206 can receive pen input data, processed touch data, and raw touch data that result from input to the tactile input device 114.

These examples of the input profile modules 122 are presented for purposes of illustration only, and a wide variety of different types and combinations of input data can be represented via the input profile modules 122 in accordance with one or more embodiments.

Having described an example environment in which the techniques described herein may operate, consider now a discussion of an example implementation scenario in accordance with one or more embodiments.

Example Implementation Scenario

Figure 3:
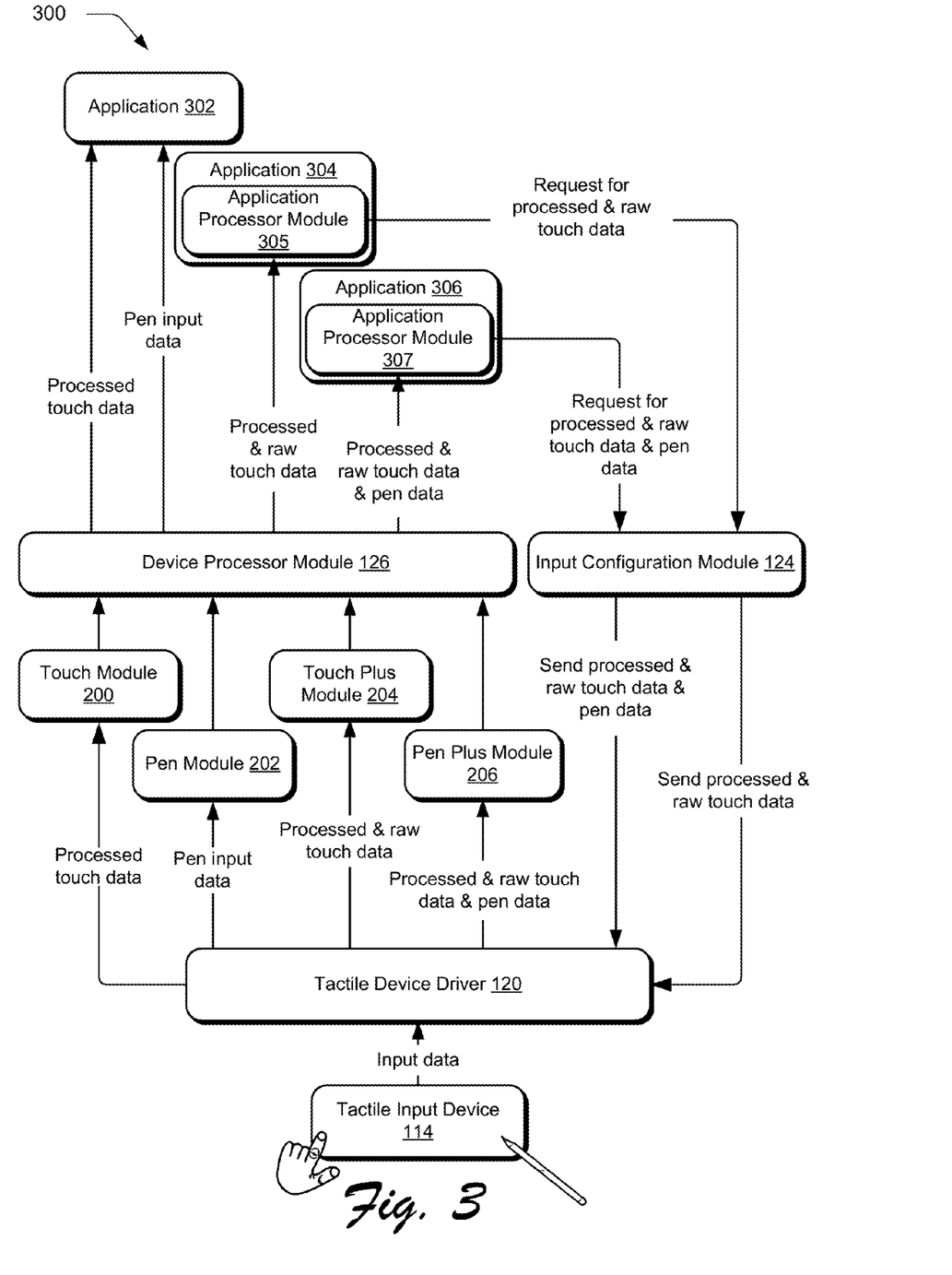
FIG. 3 illustrates an example implementation scenario in accordance with one or more embodiments.

The following discussion describes an example implementation scenario 300 in accordance with one or more embodiments. In portions of the following discussion, reference will be made to the environment 100 of FIG. 1 and the input profile modules 122.

The scenario 300 includes an application 302, an application 304, and an application 306. The applications 302, 304, and 306 can be implementations of the applications 104, the web browser 108, the operating system 110, and/or another application or entity that can utilize input from the tactile input device 114.

Further to the scenario 300, the application 302 is configured to utilize processed touch data from the touch module 200, and pen input data from the pen module 202. In implementations, the application 302 can be configured to alternately receive processed touch data or pen input data. For example, a user can provide touch input to the tactile input device 114, which produces raw touch data. The raw touch data can be processed (e.g., by the tactile device driver 120) to produce processed touch data. The processed touch data is forwarded via the touch module 200 to the device processor module 126. The device processor module 126 can further process the processed touch data to put it in a form that can be utilized by the application 302, and forward the processed touch data to the application 302. The application 302 can use the processed touch data to perform various tasks.

Further to the scenario 300, the user can provide pen input to the tactile input device 114. For example, the user can provide the pen input along with the touch input discussed above, and/or subsequent to the touch input. The tactile device driver 120 ascertains that the application 302 is configured to alternately receive touch input data or pen input data, and that the application prioritizes pen input data over touch input data. Thus, the tactile device driver 120 stops sending touch input data to the touch module 200, and initiates sending pen input data to the pen module 202. The pen module 202 delivers the pen input data to the device processor module 126, which can perform processing on the pen input data and forward the processed pen input data to the application 302.

Thus, in implementations where touch input and pen input are provided simultaneously, touch input data can be suppressed such that touch input data generated by the tactile input device 114 is not sent to the application. Such a configuration can be useful to prevent incidental touch input from causing unintentional input to an active application in a scenario where a user is providing pen input.

Continuing with the scenario 300, the application 304 is configured to utilize processed touch data and raw touch data. To enable the application 304 to receive such data, an application processor module 305 included as part of the application 304 sends a request to the input configuration module 124 to receive touch data and raw touch data. In implementations, the application processor module 305 is an example implementation of the application processor module 106, discussed above. The input configuration module 124 receives the request and notifies the tactile device driver 120 to send processed touch data and raw touch data to the application 304 via the touch plus module 204. When a user provides touch input to the tactile input device 114, the tactile device driver 120 sends processed touch data and raw touch data to the device processor module 126 via the touch plus module 204. The device processor module 126 can (optionally) perform processing on the processed touch data and/or the raw touch data, and forward the data to the application processor module 305.

The application processor module 305 can further process the processed touch data and/or the raw touch data such that the application 304 can use the processed touch data and raw touch data to perform various tasks. For example, as discussed below, the application processor module 305 can filter out specific types of input data that the application 304 is not configured to utilize. Thus, the application 304 can be provided with portions of the processed touch data and/or the raw touch data that the application 304 is configured to utilize.

Further to the scenario 300, the application 306 is configured to utilize processed touch data, raw touch data, and pen input data. Accordingly, an application processor module 307 included as part of the application 306 sends a request to the input configuration module 124 to receive processed touch data, raw touch data, and pen input data. In implementations, the application processor module 307 is an example implementation of the application processor module 106, discussed above. The input configuration module 124 receives the request and notifies the tactile device driver 120 to send processed touch data, raw touch data, and pen input data to the application 306 via the pen plus module 206. When a user provides touch input and pen input to the tactile input device 114, the tactile device driver 120 sends processed touch data, raw touch data, and pen input data to the device processor module 126 via the pen plus module 206. The device processor module 126 can (optionally) perform processing on the processed touch data, raw touch data, and pen input data, and forward the data to the application processor module 307.

The application processor module 307 can further process the processed touch data, raw touch data, and pen input data such that the application 306 can use the processed touch data, raw touch data, and pen input data to perform various tasks. For example, the application processor module 307 can filter out specific types of input data that the application 306 is not configured to utilize. Thus, the application 306 can be provided with portions of the processed touch data, raw touch data, and pen input data that the application 306 is configured to utilize.

In the scenario 300, each of the applications is discussed as receiving input data from a particular one of the input profile modules 122. In implementations, when a particular application is active and receiving input data from a particular input profile module 122, the tactile device driver 118 can refrain from sending input data via others of the input profile modules 122. For example, in a scenario where no applications that utilize raw touch data are active, the tactile device driver 120 can refrain from sending raw touch data, e.g., via the touch plus module 204 and/or the pen plus module 206. This can conserve system resources (e.g., processor bandwidth) that may be utilized to send raw touch data.

Further, although applications are illustrated as receiving input data from particular instances of the input profile modules 122, this is not intended to be limiting on the disclosed embodiments. In implementations, applications can receive input data from whichever of the input profile modules 122 is currently sending an input data stream, and can extract input data from the input data stream that the applications are configured to utilize to perform various tasks.

For example, as discussed above, the application 302 is configured to utilize processed touch data and pen input data. Thus, the application 302 may not be configured to utilize other forms of input data, such as raw touch data from the touch plus module 204. When an input data stream is being sent via the touch plus module 204, the application 302 can extract input data from the input data stream that the application 302 is configured to utilize. For example, the application 302 can extract processed touch data from the input data stream, and can ignore raw touch data included in the input data stream.

As another example and as referenced above, the application 304 is configured to utilize processed and raw touch data. Thus, in implementations, the application 304 may not be configured to utilize pen input data. When an input data stream is being sent via the pen plus module 206, the application 304 can extract input data from the input data stream that the application 304 is configured to utilize. For example, the application processor module 305 can process the input data stream, and can extract processed touch data and/or raw touch data from the input data stream. The application processor module 305 can provide the processed touch data and/or the raw touch data to the application 304 to enable the application 304 to perform various tasks using the input data.

Thus, techniques discussed herein can enable an application to utilize at least some input data extracted from various different input data streams, even if the application is not configured to utilize and/or understand all of the input data in a particular input data stream. For example, the application processor modules 106 (e.g., the application processor module 305 and/or the application processor module 307) can be configured to extract specific types of input data for particular applications. Thus, the applications can be provided with types of input data that the applications are configured to utilize and/or understand.

Having discussed an example implementation scenario, consider now some example procedures in accordance with one or more embodiments.

Example Procedures

The following discussion describes example procedures for providing input data type profiles in accordance with one or more embodiments. In portions of the following discussion, reference will be made to the environment 100 of FIG. 1 and the example implementation scenario discussed above.

Figure 4:
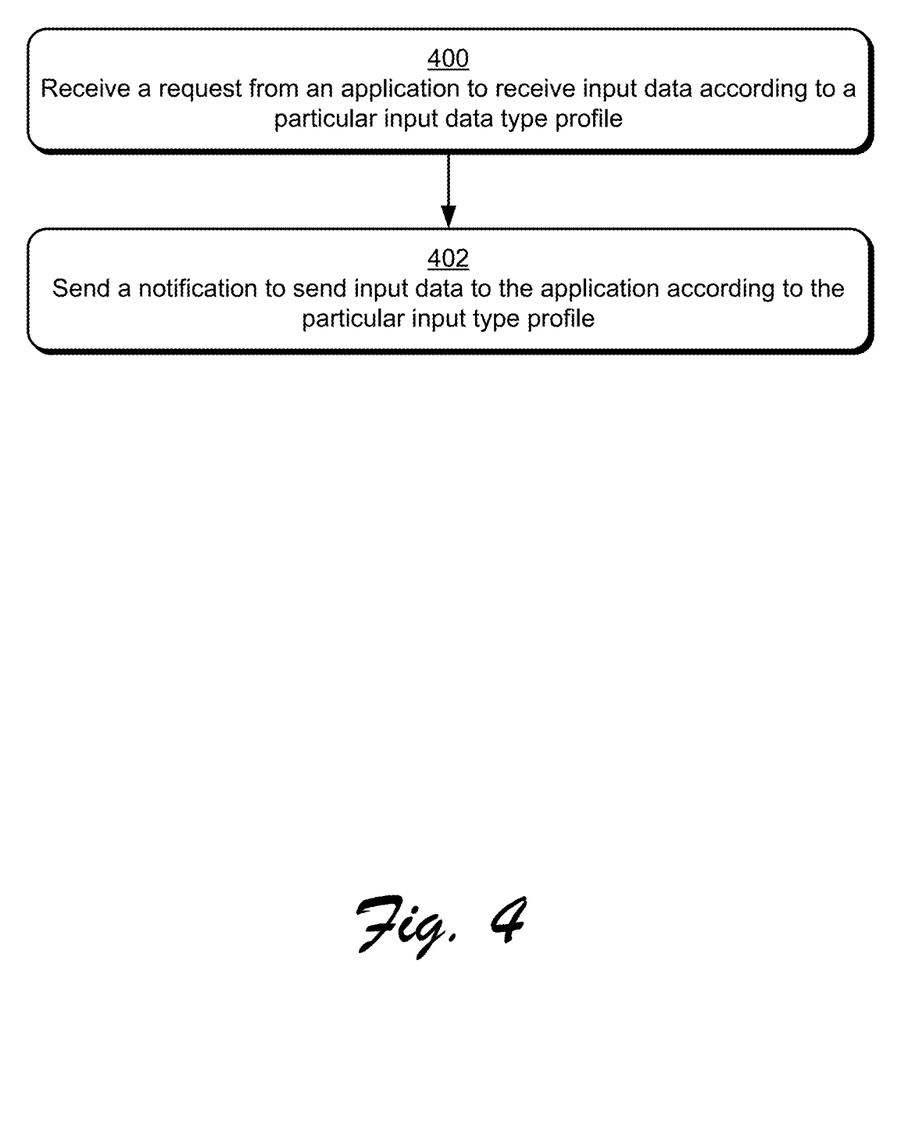
FIG. 4 is a flow diagram that describes steps in a method in accordance with one or more embodiments.

FIG. 4 is a flow diagram that describes steps in a method in accordance with one or more embodiments. Step 400 receives a request from an application to receive input data according to a particular input data type profile. For example, the input configuration module 124 can receive a request from the applications 104 (e.g., from one of the application processor modules 106), the operating system 110, and so forth, to be sent input data according to a particular input data type and/or combination of input data types. Examples of input data types and combinations of input data types are discussed above with reference to the input profile modules 122.

Step 402 sends a notification to send input data to the application according to the particular input data type profile. As discussed above, the input configuration module 124 can notify the tactile device driver 120 (or other of the input device drivers 118) to send input to an application or other entity via a particular one of the input profile modules 122.

Figure 5:
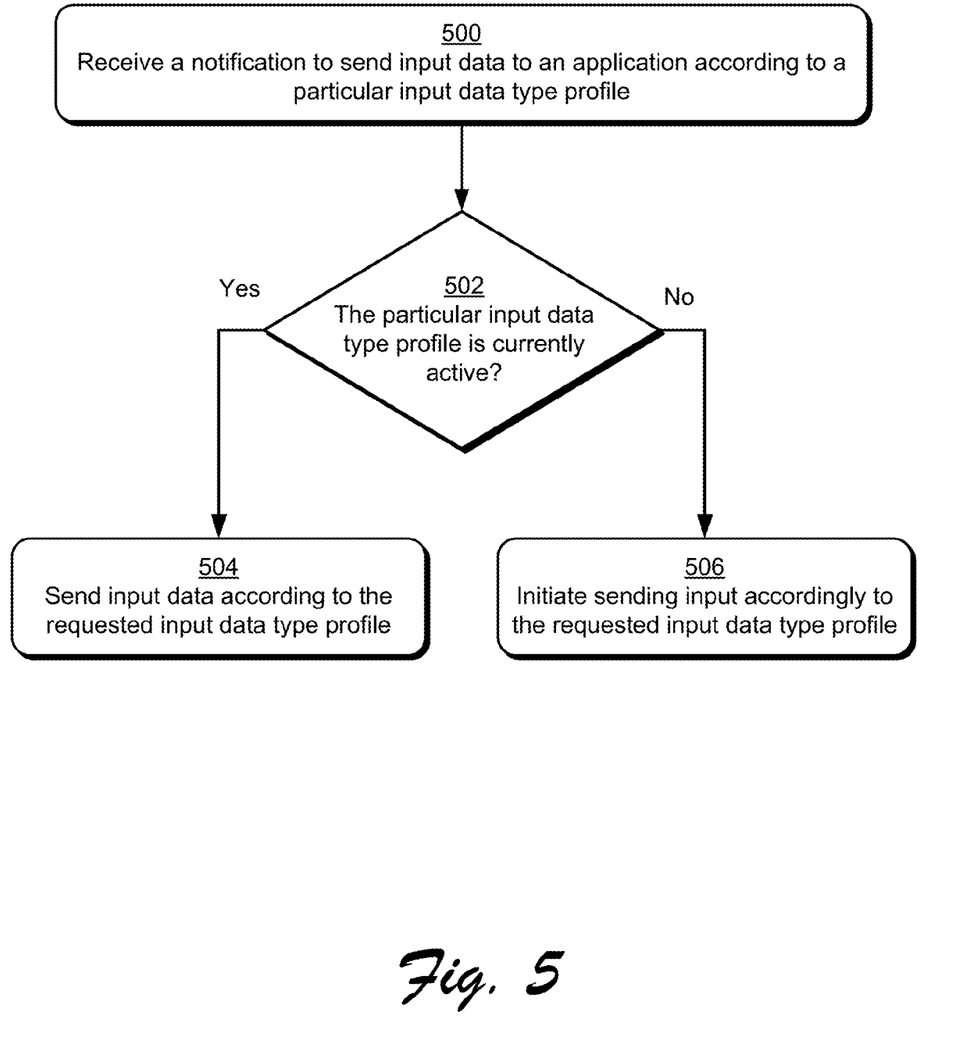
FIG. 5 is a flow diagram that describes steps in a method in accordance with one or more embodiments.

FIG. 5 is a flow diagram that describes steps in a method in accordance with one or more embodiments. In implementations, the method describes a continuation of the method discussed above with respect to FIG. 4. Step 500 receives a notification to send input data to an application according to a requested input data type profile. For example, the tactile device driver 120 can receive a notification from the input configuration module 124 to send a particular type and/or combination of tactile input data to an application.

Step 502 ascertains whether the requested input data type profile is currently active. For example, the tactile device driver 120 can ascertain whether it is currently sending input data based on the requested input data type profile. The tactile device driver 120, for instance, can determine whether the requested input profile matches one of the input profile modules 122 currently being used to send tactile input data.

If the requested input profile is currently active ("Yes"), step 504 sends input data according to the requested input data type profile. For example, the tactile device driver 120 can send tactile input data to the device processor module 126 and/or one of the applications 104 via one of the input profile modules 122 that corresponds to the requested input data type profile.

If the particular input profile is not currently active ("No"), step 506 initiates sending input data accordingly to the requested input data type profile. For example, the tactile device driver 120 can switch from sending input data via one of the input profile modules 122, to sending input via a different one of the input profile modules 122 that corresponds to the requested input data type profile. As discussed above, some input profiles specify multiple different types of input data, such as combinations of raw touch data, processed touch data, pen input data, and so on. Thus, at least some input profiles (e.g., input profile modules 122) can be leveraged to send multiple different types of input data in parallel.

Figure 6:
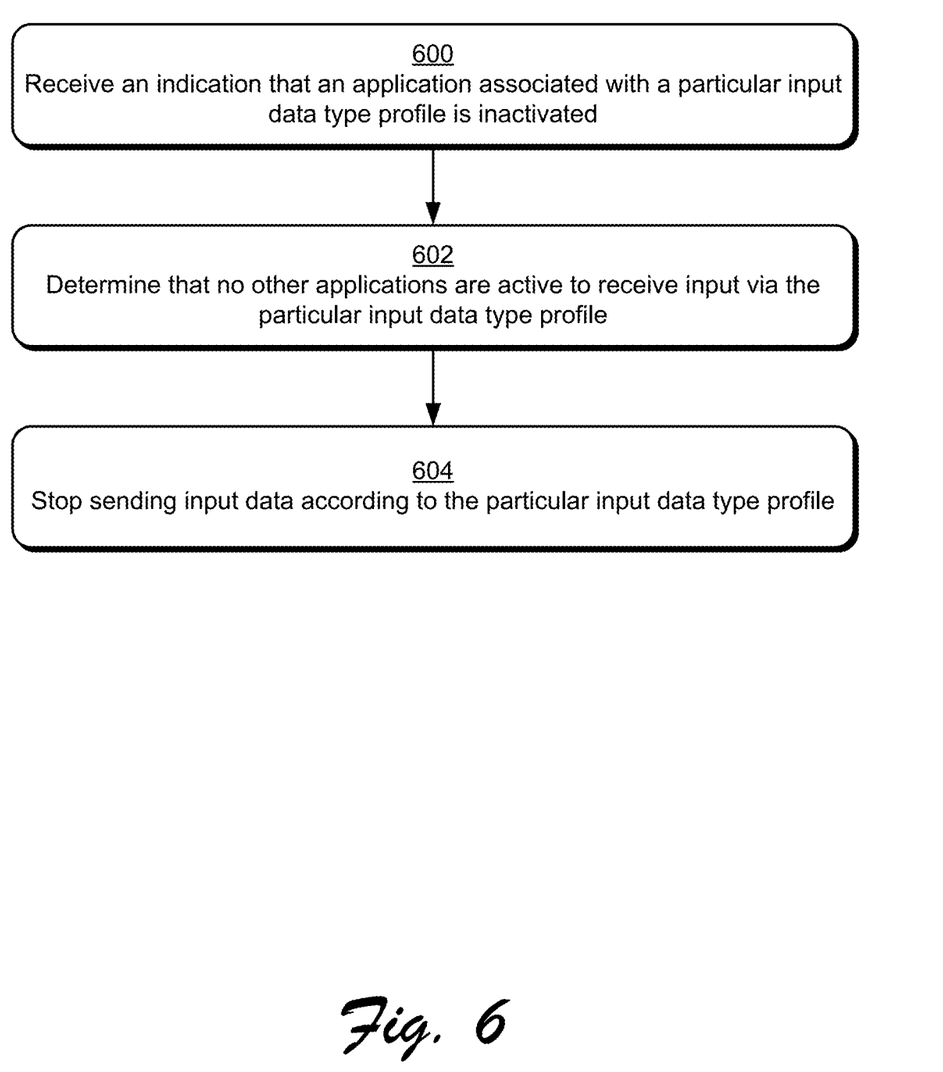
FIG. 6 is a flow diagram that describes steps in a method in accordance with one or more embodiments.

FIG. 6 is a flow diagram that describes steps in a method in accordance with one or more embodiments. In implementations, the method describes a continuation of the methods discussed above with respect to FIGS. 4 and 5.

Step 600 receives an indication that an application associated with a particular input data type profile is inactivated. For example, the input configuration module 124 and/or the tactile device driver 120 can receive an indication that a formerly active application has become inactive. The application, for instance, may be closed such that the application is no longer running on a computing device. Alternatively, a graphical user interface for the application can be visually minimized on a display screen, thus indicating that the application is not in focus as part of a user interaction. In implementations, the input configuration module 124 can receive a notification that the application is has become inactive, and can notify the tactile device driver 120.

Step 602 determines that no other applications are active to receive input via the particular input data type profile. For example, the input configuration module 124 and/or the tactile device driver 120 can determine that no other applications are active to receive input data according to a particular one of the input profile modules 122 associated with the inactivated application.

Step 604 stops sending input data according to the particular input data type profile. For instance, in response to the indication that the application is inactivated and/or that no other applications are active to receive input via the particular input data type profile, the tactile device driver 120 can stop sending input data that corresponds to the particular input data type profile. The tactile device driver 120, for example, can stop sending input data via one of the input profile modules 122 that corresponds to the particular input data type profile. Thus, in implementations, device resources can be conserved by not sending input data that is not being consumed by an application or other process.

Having discussed some example procedures, consider now a discussion of an example system and device in accordance with one or more embodiments.

Example System and Device

Figure 7:
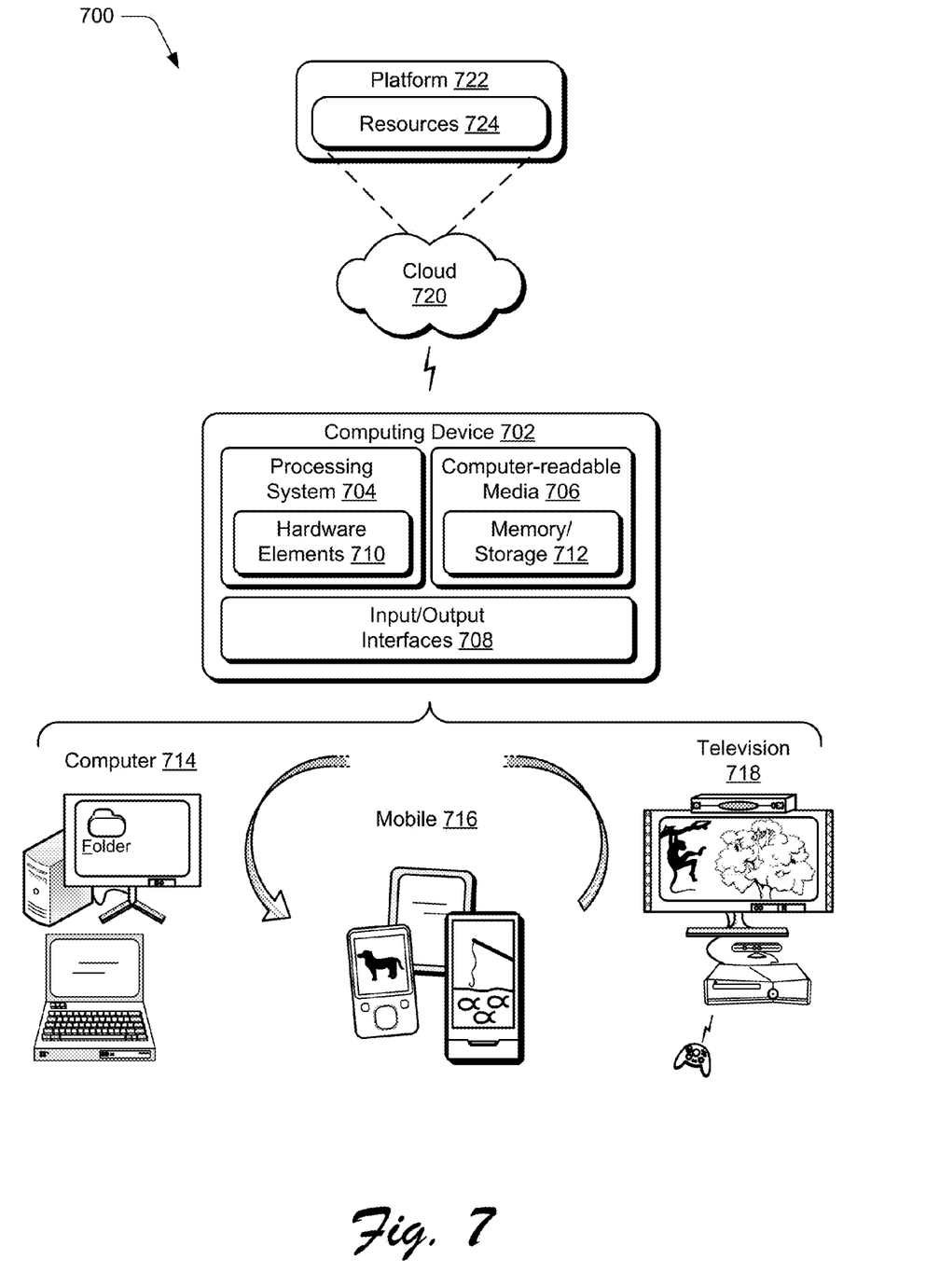
FIG. 7 illustrates an example system and computing device as described with reference to FIG. 1, which are configured to implement embodiments of techniques described herein.

FIG. 7 illustrates an example system generally at 700 that includes an example computing device 702 that is representative of one or more computing systems and/or devices that may implement various techniques described herein. For example, the computing device 102 discussed above with reference to FIG. 1 can be embodied as the computing device 702. The computing device 702 may be, for example, a server of a service provider, a device associated with the client (e.g., a client device), an on-chip system, and/or any other suitable computing device or computing system.

The example computing device 702 as illustrated includes a processing system 704, one or more computer-readable media 706, and one or more Input/Output (I/O) Interfaces 708 that are communicatively coupled, one to another. Although not shown, the computing device 702 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 704 is representative of functionality to perform one or more operations using hardware. Accordingly, the processing system 704 is illustrated as including hardware element 710 that may be configured as processors, functional blocks, and so forth. This may include implementation in hardware as an application specific integrated circuit or other logic device formed using one or more semiconductors. The hardware elements 710 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 706 is illustrated as including memory/storage 712. The memory/storage 712 represents memory/storage capacity associated with one or more computer-readable media. The memory/storage 712 may include volatile media (such as random access memory (RAM)) and/or nonvolatile media (such as read only memory (ROM), Flash memory, optical disks, magnetic disks, and so forth). The memory/storage 712 may include fixed media (e.g., RAM, ROM, a fixed hard drive, and so on) as well as removable media (e.g., Flash memory, a removable hard drive, an optical disc, and so forth). The computer-readable media 706 may be configured in a variety of other ways as further described below.

Input/output interface(s) 708 are representative of functionality to allow a user to enter commands and information to computing device 702, and also allow information to be presented to the user and/or other components or devices using various input/output devices. Examples of input devices include a keyboard, a cursor control device (e.g., a mouse), a microphone (e.g., for voice recognition and/or spoken input), a scanner, touch functionality (e.g., capacitive or other sensors that are configured to detect physical touch), a camera (e.g., which may employ visible or non-visible wavelengths such as infrared frequencies to detect movement that does not involve touch as gestures), and so forth. Examples of output devices include a display device (e.g., a monitor or projector), speakers, a printer, a network card, tactile-response device, and so forth. Thus, the computing device 702 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 702. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media does not include signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 702, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, radio frequency (RF), infrared, and other wireless media.

As previously described, hardware elements 710 and computer-readable media 706 are representative of instructions, modules, programmable device logic and/or fixed device logic implemented in a hardware form that may be employed in some embodiments to implement at least some aspects of the techniques described herein. Hardware elements may include components of an integrated circuit or on-chip system, an application-specific integrated circuit (ASIC), a field-programmable gate array (FPGA), a complex programmable logic device (CPLD), and other implementations in silicon or other hardware devices. In this context, a hardware element may operate as a processing device that performs program tasks defined by instructions, modules, and/or logic embodied by the hardware element as well as a hardware device utilized to store instructions for execution, e.g., the computer-readable storage media described previously.

Combinations of the foregoing may also be employed to implement various techniques and modules described herein. Accordingly, software, hardware, or program modules and other program modules may be implemented as one or more instructions and/or logic embodied on some form of computer-readable storage media and/or by one or more hardware elements 710. The computing device 702 may be configured to implement particular instructions and/or functions corresponding to the software and/or hardware modules. Accordingly, implementation of modules that are executable by the computing device 702 as software may be achieved at least partially in hardware, e.g., through use of computer-readable storage media and/or hardware elements 710 of the processing system. The instructions and/or functions may be executable/operable by one or more articles of manufacture (for example, one or more computing devices 702 and/or processing systems 704) to implement techniques, modules, and examples described herein.

As further illustrated in FIG. 7, the example system 700 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 700, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 702 may assume a variety of different configurations, such as for computer 714, mobile 716, and television 718 uses. Each of these configurations includes devices that may have generally different constructs and capabilities, and thus the computing device 702 may be configured according to one or more of the different device classes. For instance, the computing device 702 may be implemented as the computer 714 class of a device that includes a personal computer, desktop computer, a multi-screen computer, laptop computer, netbook, and so on.

The computing device 702 may also be implemented as the mobile 716 class of device that includes mobile devices, such as a mobile phone, portable music player, portable gaming device, a tablet computer, a multi-screen computer, and so on. The computing device 702 may also be implemented as the television 718 class of device that includes devices having or connected to generally larger screens in casual viewing environments. These devices include televisions, set-top boxes, gaming consoles, and so on.

The techniques described herein may be supported by these various configurations of the computing device 702 and are not limited to the specific examples of the techniques described herein. For example, functionalities discussed with reference to the computing device 102 may be implemented all or in part through use of a distributed system, such as over a "cloud" 720 via a platform 722 as described below.

The cloud 720 includes and/or is representative of a platform 722 for resources 724. The platform 722 abstracts underlying functionality of hardware (e.g., servers) and software resources of the cloud 720. The resources 724 may include applications and/or data that can be utilized while computer processing is executed on servers that are remote from the computing device 702. Resources 724 can also include services provided over the Internet and/or through a subscriber network, such as a cellular or Wi-Fi network.

The platform 722 may abstract resources and functions to connect the computing device 702 with other computing devices. The platform 722 may also serve to abstract scaling of resources to provide a corresponding level of scale to encountered demand for the resources 724 that are implemented via the platform 722. Accordingly, in an interconnected device embodiment, implementation of functionality described herein may be distributed throughout the system 700. For example, the functionality may be implemented in part on the computing device 702 as well as via the platform 722 that abstracts the functionality of the cloud 720.

Discussed herein are a number of methods that may be implemented to perform techniques discussed herein.

Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods can be implemented via interaction between various entities discussed above with reference to the environment 100.

CONCLUSION

Techniques for providing input data type profiles are described. Although embodiments are described in language specific to structural features and/or methodological acts, it is to be understood that the embodiments defined in the appended claims are not necessarily limited to the specific features or acts described. Rather, the specific features and acts are disclosed as example forms of implementing the claimed embodiments.

What is claimed is:

1. One or more tangible computer-readable storage media comprising instructions stored thereon that, responsive to execution by a computing device, cause the computing device to implement modules comprising:
    a set of modules including logic that is executable by one or more processors to specify different combinations of input data types; and
    an input configuration module including logic that is executable by the one or more processors to perform operations comprising:
        receiving a request from a first application for input data according to an input data type profile associated with a first module of the set of modules, the first module specifying a combination of raw touch data and processed touch data;
        receiving a request from a second application for input data according to an input data type profile associated with a second module of the set of modules, wherein the second module specifies a different combination of input data types than the first module; and
        notifying an input device driver to send input data to the first application based on the input data type profile for the first module, and to send input data to the second application according to the input data type profile for the second module, the input device driver configured to perform operations comprising:
            receiving a notification from the input configuration module to send input data generated by an input device to the first application; and
            sending the raw touch data and the processed touch data of the first module in parallel to the first application.

2. One or more tangible computer-readable storage media as described in claim 1, wherein at least one module of the set of modules specifies a combination of raw touch data, processed touch data, and pen data.

3. One or more tangible computer-readable storage media as described in claim 1, wherein the input device driver is configured to perform operations comprising:
    receiving a notification from the input configuration module to send input data, generated by an input device, to the second application, wherein the second module specifies a combination of multiple input data types; and
    sending input data based on the multiple input data types of the second module in parallel to the second application.

4. One or more tangible computer-readable storage media as described in claim 1, wherein the input device driver is configured to perform operations comprising:
    receiving a notification from the input configuration module to send input data generated by a tactile input device to the second application, wherein the second module specifies a combination of multiple types of input data generated via input to the tactile input device; and
    sending the input data based on the multiple types of input data of the second module in parallel to the second application.

5. One or more tangible computer-readable storage media as described in claim 1, wherein the input device driver is configured to perform operations comprising:
    receiving a notification from the input configuration module to send input data generated by an input device to the second application, wherein the second module specifies a combination of raw touch data, processed touch data, and pen data; and
    sending the raw touch data, processed touch data, and pen data of the second module in parallel to the second application.

6. One or more tangible computer-readable storage media as described in claim 1, wherein the input configuration module is configured to perform operations comprising notifying the input device driver to switch from sending input according to one module of the set of modules, to sending input according to a different module of the set of modules.

7. One or more tangible computer-readable storage media as described in claim 1, wherein the set of modules are configured to enable different combinations of input data types to be sent to different applications in parallel.

8. One or more tangible computer-readable storage media as described in claim 1, further comprising an application processor module associated with at least one of the applications and including logic that is executable by the one or more processors to perform operations comprising:
    extracting one or more types of input data from a stream of input data sent via a module of the set of modules; and
    providing the one or more types of input data to the at least one of the applications.

9. A computer-implemented method, comprising:
    receiving, by a computing device, a request from an application to receive input data according to a particular input data type profile, the particular input data type profile being associated with multiple input data types to be sent in parallel;
    sending, by the computing device, a notification to an input device to send input data to the application according to the particular input data type profile;
    receiving, by the computing device, an indication that the application is at least temporarily inactive; and
    responsive to receiving the indication:
        determining, by the computing device that no other application is active to receive the input data according to the particular input data type profile; and
        sending, by the computing device, a notification to the input device to stop sending input data to the application according to the particular input data type profile.

10. A method as described in claim 9, wherein the multiple input data types comprise multiple types of input data generated via input to a tactile input device.

11. A method as described in claim 9, wherein the multiple input data types comprise raw touch data and processed touch data generated via input to a tactile input device.

12. A method as described in claim 9, wherein the multiple input data types comprise raw touch data, processed touch data, and pen data generated via input to a tactile input device.

13. A method as described in claim 9, wherein said sending comprises sending the notification to a device driver for the input device.

14. A method as described in claim 9, wherein the input device comprises a tactile input device, and wherein said sending comprises sending the notification to a device driver for the tactile input device such that the device driver sends multiple types of input data for receipt by the application.

15. A system, comprising:
one or more processors; and
one or more computer-readable storage media storing computer-executable instructions that are executable by the one or more processors to perform operations including:
receiving a notification to send input data to an application according to an input data type profile that specifies multiple types of input data generated via input to a tactile input device including raw tactile input data and processed tactile input data, the processed tactile input data being a product of and different than the raw tactile input data; and
initiating sending input data to the application based on the input data type profile such that the multiple types of input data generated via input to the tactile input device are sent to the application in parallel.

16. A system as described in claim 15, wherein the multiple types of input data further includes pen data.

17. A method as described in claim 9, wherein said receiving the indication that the application is at least temporarily inactive comprises receiving an indication that a graphical user interface of the application is not in focus.

18. A method as described in claim 9, further comprising:
determining that the application is activated to receive input according to the particular input data type profile; and
sending, by the computing device, a further notification to the input device to begin sending input data to the application according to the particular input data type profile.

19. One or more tangible computer-readable storage media as described in claim 1, wherein the input configuration module further includes logic that is executable by the one or more processors to perform operations comprising:
receiving an indication that the first application is at least temporarily inactive; and
responsive to receiving the indication:
determining that no other application is active to receive the input data according to the input data type profile associated with the first module; and
sending a notification to the input device driver to stop sending input data to the first application according to the input data type profile associated with the first module.

20. A system as described in claim 15, the operations further including:
receiving an indication that the application is at least temporarily inactive; and
responsive to receiving the indication:
determining that no other application is active to receive the input data according to the input data type profile; and
sending a notification to the tactile input device to stop sending input data to the application according to the input data type profile.

* * * * *